(12) United States Patent
Kubota et al.

(10) Patent No.: US 8,974,729 B2
(45) Date of Patent: Mar. 10, 2015

(54) ANTI-THERMALLY-EXPANSIVE RESIN AND ANTI-THERMALLY-EXPANSIVE METAL

(71) Applicants: Canon Kabushiki Kaisha, Tokyo (JP); Kyoto University, Kyoto (JP)

(72) Inventors: Makoto Kubota, Yokohama (JP); Kaoru Miura, Matsudo (JP); Hisato Yabuta, Machida (JP); Yoshihiko Matsumura, Tokyo (JP); Yuichi Shimakawa, Uji (JP); Masaki Azuma, Uji (JP)

(73) Assignees: Canon Kabushiki Kaisha, Tokyo (JP); Kyoto University, Kyoto-shi (JP)

( * ) Notice: Subject to any disclaimer, the term of this patent is extended or adjusted under 35 U.S.C. 154(b) by 0 days.

(21) Appl. No.: 14/152,404

(22) Filed: Jan. 10, 2014

(65) Prior Publication Data

US 2014/0134038 A1    May 15, 2014

Related U.S. Application Data

(62) Division of application No. 13/205,258, filed on Aug. 8, 2011, now Pat. No. 8,664,316.

(30) Foreign Application Priority Data

Aug. 12, 2010  (JP) ................................. 2010-180886
Apr. 26, 2011  (JP) ................................. 2011-097852

(51) Int. Cl.
*C22C 1/10* (2006.01)
*C04B 35/453* (2006.01)
(Continued)

(52) U.S. Cl.
CPC .................. *C04B 35/453* (2013.01); *C22C 1/10* (2013.01); *C04B 35/50* (2013.01); *C01G 53/006* (2013.01);
(Continued)

(58) Field of Classification Search
CPC ........ C01G 53/006; C01G 53/40; C22C 1/05; C22C 1/10; C04B 35/01; C04B 35/453; C04B 35/50; C04B 35/505
See application file for complete search history.

(56) References Cited

U.S. PATENT DOCUMENTS 4,999,336 A * 3/1991 Nadkarni et al. ............. 505/124
5,694,503 A   12/1997 Fleming et al.
(Continued)

FOREIGN PATENT DOCUMENTS

CN        1526029 A        9/2004
JP        61-175035 A      8/1986
(Continued)

OTHER PUBLICATIONS

Ishiwata (Pressure/temperature/substitution-induced melting of A-site charge disproportionation in Bi1-xLaxNiO3 (0≤x≤0.5). Physical Review B 72 2005, pp. 045104-1 to 045104-7).*

(Continued)

*Primary Examiner* — Brieann R Fink
(74) *Attorney, Agent, or Firm* — Fitzpatrick, Cella, Harper & Scinto

(57) ABSTRACT

Provided are resin-based and metal-based anti-thermally-expansive members each having small thermal expansion. More specifically, provided are an anti-thermally-expansive resin and an anti-thermally-expansive metal, each including a resin or a metal having a positive linear expansion coefficient at 20° C. and a solid particle dispersed in the resin or metal, in which the solid particle includes at least an oxide represented by the following general formula (1): $(Bi_{1-x}M_x)NiO_3$ (1), where M represents at least one metal selected from the group consisting of La, Pr, Nd, Sm, Eu, Gd, Tb, Dy, Ho, Er, Tm, Yb, Lu, Y, and In; and x represents a numerical value of $0.02 \leq x \leq 0.15$.

3 Claims, 1 Drawing Sheet

(51) Int. Cl.
| | |
|---|---|
| C04B 35/50 | (2006.01) |
| C01G 53/00 | (2006.01) |
| C08K 3/22 | (2006.01) |
| C08K 3/00 | (2006.01) |
| C09K 5/06 | (2006.01) |

(52) U.S. Cl.
CPC . C08K 3/22 (2013.01); C01G 53/40 (2013.01); C08K 3/0091 (2013.01); C09K 5/06 (2013.01); C01P 2006/32 (2013.01); C01P 2002/52 (2013.01); C01P 2002/54 (2013.01); C01P 2004/61 (2013.01)
USPC ............ 420/528; 423/263; 420/550; 420/445

(56) References Cited

U.S. PATENT DOCUMENTS

| | | | |
|---|---|---|---|
| 6,132,676 A * | 10/2000 | Holzer et al. | 419/20 |
| 7,187,083 B2 | 3/2007 | Lewis et al. | |
| 7,663,242 B2 | 2/2010 | Lewis et al. | |
| 2002/0175403 A1 | 11/2002 | Sreeram et al. | |
| 2003/0062553 A1 | 4/2003 | Ramesh et al. | |
| 2005/0191515 A1 | 9/2005 | Brese et al. | |
| 2005/0223846 A1* | 10/2005 | Lo et al. | 75/234 |
| 2006/0118160 A1 | 6/2006 | Funahashi et al. | |
| 2007/0125412 A1* | 6/2007 | Funahashi | 136/201 |
| 2007/0135550 A1 | 6/2007 | Chakrapani et al. | |
| 2009/0004087 A1 | 1/2009 | Takenaka et al. | |
| 2012/0040196 A1 | 2/2012 | Kubota et al. | |

FOREIGN PATENT DOCUMENTS

| | | |
|---|---|---|
| JP | 10-096827 A | 4/1998 |
| JP | 2008-260892 A | 10/2008 |
| JP | 2010-021429 A | 1/2010 |
| JP | 2010-029990 A | 2/2010 |
| WO | 2006/011590 A1 | 2/2006 |

OTHER PUBLICATIONS

S. Ishiwata et al., "Pressure/temperature/substitution-induced Melting of A-site Charge Disproportionation in Bi1-xLaxNiO3 (0≤x ≤0.5)," Los Alomos National Laboratory, Reprint Archive, Condensed Matter, pp. 1-24 (http://xxx.lanl.gov/ftp/cond-mat/papers/0502/0502066.pdf) (Feb. 2005) (XP-002664113).
H. Wadati et al., "Valence changes associated with the metal-insulator transition in Bi1-xLaxNiO3," Los Alomos National Laboratory, Reprint Archive, Condensed Matter, pp. 1-6 (http://xxx.lanl.gov/PS_cache/cond-mat/pdf/0505/0505646v1.pdf) (May 2005) (XP-002664114).
Thermal expansion—Wikipedia, the free encyclopedia (13 pages; Nov. 2011) (XP-002664116).
List of thermal conductivities—Wikipedia, the free encyclopedia (9 pages; Oct. 2011) (XP-002664117).
S. Ishiwata et al., "Structure and Physical Properties of Bi1-xLaxNiO3," 13 Kotai no Hannosei Toronkai Koen Yokoshu 25-27 (2002) (Abstract).
Non-final Office Action in U.S. Appl. No. 13/205,272 (Jun. 27, 2012).
Shintaro Ishiwata et al., "Suppression of a Site Charge Disproportionation in Bi1-xLaxNiO3," 329-333 Physica B 813-814 (2003) (XP-002664115).
Extended European Search Report in Application No. 11177212.5 (Dec. 2011).
Masaki Azuma et al., "Colossal negative thermal expansion in BiNiO3 induced by intermetallic charge transfer," Nature communication, p. 1-5 (Jun. 14, 2011).
Office Action in Chinese Application No. 201110228962.9 (dated Apr. 18, 2013).
H. Wadati et al., "Valence Changes Associated with the Metal-Insulator Transition in Bi1-xLaxNiO3," 72 Phys. Rev. B 155103-1-155103-5 (Oct. 2005).
S. Ishiwata et al., "Pressure/Temperature/Substitution-Induced Melting of A-site Charge Disproportionation in Bi1-xLaxNiO3 (0≤x ≤0.5)," 72 Phys. Rev. B 045104-1-045104-7 (Jul. 2005).
Hiroki Wadati et al., "Temperature-Dependent Photoemission and X-Ray Absorption Studies of the Metal-Insulator Transition in Bi1-xLaxNiO3," 76 Phys. Rev. B 205123-1-205123-4 (Nov. 2007).
Extended European Search Report in European Application No. 11177211.7 (Oct. 17, 2011).
Goodfellows (Polybenzimidazole, 2013, 3 pages).

* cited by examiner

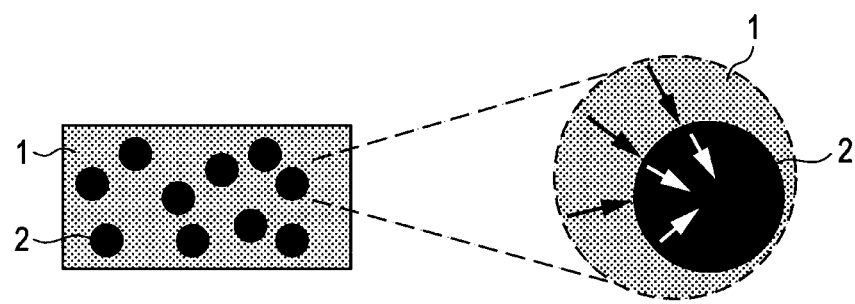
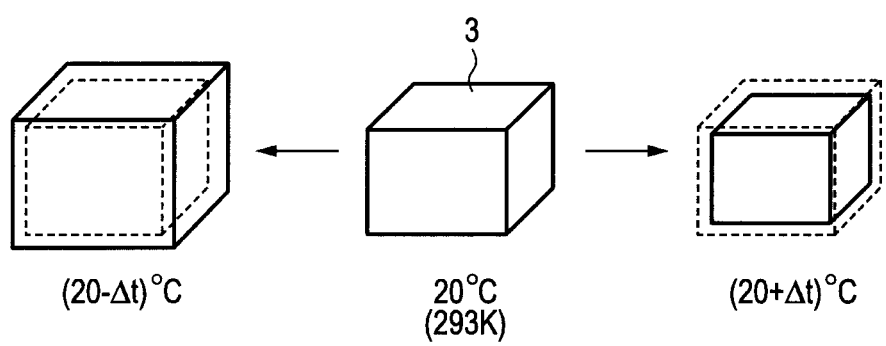

ANTI-THERMALLY-EXPANSIVE RESIN AND ANTI-THERMALLY-EXPANSIVE METAL

CROSS-REFERENCE TO RELATED APPLICATIONS

This application is a divisional application of application Ser. No. 13/205,258, filed Aug. 8, 2011, which claims the benefit of Japanese Patent Application No. 2010-180886, filed Aug. 12, 2010, and Japanese Patent Application No. 2011-097852, filed Apr. 26, 2011. All prior applications are incorporated herein by reference in their entirety.

BACKGROUND OF THE INVENTION

1. Field of the Invention

The present invention relates to an anti-thermally-expansive resin and an anti-thermally-expansive metal, and more particularly, to a novel anti-thermally-expansive member in which an oxide having negative thermal expansion properties is dispersed in a resin matrix or a metal matrix.

2. Description of the Related Art

In general, an electronic member, an optical member, and a structural member are made of materials such as metal, resin, ceramic, and glass. These conventional materials expand or contract depending upon an increase or decrease in environmental temperature due to their positive thermal expansion properties. In particular, a resin material and a metal material each have a large volume expansion rate with respect to external heat, and hence a member using such material influences the performance of precision equipment.

In order to solve such problem, the use of a metal oxide having negative thermal expansion properties has been proposed.

For example, Japanese Patent Application Laid-Open No. 2008-260892 discloses an epoxy-resin-based adhesive whose thermal expansion is suppressed by mixing zirconium phosphate tungstate having a linear expansion coefficient of $-3 \times 10^{-6}/°C$. However, there is a problem in that the tungstic-acid-based metal oxide still has a small absolute value of a linear expansion coefficient showing negative thermal expansion properties.

PCT Publication WO2006-011590A discloses a material including a manganese nitride as a main component to increase a negative linear expansion coefficient to $-60 \times 10^{-6}/°C$. at largest. Further, Japanese Patent Application Laid-Open No. 2010-021429 discloses an epoxy-resin-based sealing member for an electronic component whose thermal expansion is suppressed by mixing zirconium tungstate having a linear expansion coefficient of $-3 \times 10^{-6}/°C$. or a manganese nitride having a linear expansion coefficient of $-25 \times 10^{-6}/°C$. However, there are problems in that such negative thermal expansion material including a manganese nitride exhibits negative thermal expansion properties in a narrow temperature region, and in that the material having a larger absolute value of a linear expansion coefficient exhibits negative thermal expansion properties in lower temperature regions compared with a practical temperature region.

The present invention has been achieved in order to solve the problems. An object of the present invention is to provide an anti-thermally-expansive resin and an anti-thermally-expansive metal including a Bi-based thermal expansion suppressing member having negative thermal expansion properties dispersed in a resin or a metal.

SUMMARY OF THE INVENTION

An anti-thermally-expansive resin for solving the above-mentioned problems includes a resin having a positive linear expansion coefficient at 20° C. and a solid particle dispersed in the resin, in which the solid particle includes at least an oxide represented by the following general formula (1):

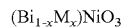

where M represents at least one metal selected from the group consisting of La, Pr, Nd, Sm, Eu, Gd, Tb, Dy, Ho, Er, Tm, Yb, Lu, Y, and In; and x represents a numerical value of $0.02 \leq x \leq 0.15$.

An anti-thermally-expansive metal for solving the above-mentioned problems includes a metal having a positive linear expansion coefficient at 20° C. and a solid particle dispersed in the metal, in which the solid particle includes at least an oxide represented by the following general formula (1):

$$(Bi_{1-x}M_x)NiO_3 \tag{1}$$

where M represents at least one metal selected from the group consisting of La, Pr, Nd, Sm, Eu, Gd, Tb, Dy, Ho, Er, Tm, Yb, Lu, Y, and In; and x represents a numerical value of $0.02 \leq x \leq 0.15$.

According to the present invention, the anti-thermally-expansive resin and anti-thermally-expansive metal each having reduced thermal expansion can be provided by dispersing a thermal expansion suppressing member having negative thermal expansion properties in a resin or a metal.

Further features of the present invention will become apparent from the following description of exemplary embodiments with reference to the attached drawings.

BRIEF DESCRIPTION OF THE DRAWINGS

FIGS. 1 and 1E are schematic vertical cross-sectional views showing an example of an embodiment of an anti-thermally-expansive resin and anti-thermally-expansive metal of the present invention.

FIG. 2 is a view conceptually showing negative thermal expansion properties of an oxide represented by the general formula (1).

DESCRIPTION OF THE EMBODIMENTS

Hereinafter, embodiments for carrying out the present invention are described.

An anti-thermally-expansive resin according to the present invention includes a resin having a positive linear expansion coefficient at 20° C. and a solid particle dispersed in the resin, in which the solid particle includes at least an oxide represented by the following general formula (1).

Further, an anti-thermally-expansive metal according to the present invention includes a metal having a positive linear expansion coefficient at 20° C. and a solid particle dispersed in the metal, in which the solid particle includes at least an oxide represented by the following general formula (1):

$$(Bi_{1-x}M_x)NiO_3 \tag{1}$$

where M represents at least one metal selected from the group consisting of La, Pr, Nd, Sm, Eu, Gd, Tb, Dy, Ho, Er, Tm, Yb, Lu, Y, and In; and x represents a numerical value of $0.02 \leq x \leq 0.15$.

In the present invention, the anti-thermally-expansive resin refers to a solid resin with suppressed volume expansion with respect to external heat compared with a simple resin serving as its base.

Similarly, in the present invention, the anti-thermally-expansive metal refers to a solid metal with suppressed volume expansion with respect to external heat compared with a simple metal serving as its base.

Hereinafter, the anti-thermally-expansive resin and the anti-thermally-expansive metal are described collectively.

FIG. 1 is a schematic vertical cross-sectional view showing an example of an embodiment of the anti-thermally-expansive resin and anti-thermally-expansive metal of the present invention.

In the figure, a matrix 1 is formed of a resin having a positive linear expansion coefficient at 20° C. in the case of the anti-thermally-expansive resin of the present invention. Further, in the case of the anti-thermally-expansive metal of the present invention, the matrix 1 is formed of a metal having a positive linear expansion coefficient at 20° C.

In the figure, a solid particle 2 contains at least the oxide represented by the above-mentioned general formula (1). In the figure, for convenience of description, the solid particle 2 is expressed in a spherical shape. However, the solid particle 2 may have an indefinite shape such as a plate shape or a needle shape. The average particle size of the solid particle 2 in terms of a spherical particle with the same volume is preferably 0.1 µm or more and 2 mm or less, more preferably 0.5 µm or more and 1 mm or less.

A portion surrounded by the dotted line on the right side of the figure is an enlarged schematic view (FIG. 1E) showing the contact state between the matrix 1 and the solid particle 2. Black arrows in the figure schematically indicate a stress applied by the matrix 1 on the interface between the matrix 1 and the solid particle 2 at temperature increase. On the other hand, white arrows schematically indicate a stress applied by the solid particle 2 on the interface between the solid particle 2 and the matrix 1 at temperature increase. More specifically, when external heat is given, the thermal contraction of the solid particle 2 follows the thermal expansion of the matrix 1, so that the overall volume change can be suppressed.

The solid particle 2 has negative thermal expansion properties in a normal condition (20° C., 101.3 kPa). The solid particle 2 contains at least the oxide represented by the general formula (1), and the oxide induces the negative thermal expansion properties of the solid particle 2.

FIG. 2 is a view conceptually showing negative thermal expansion properties of the oxide represented by the general formula (1). A solid body 3 in the figure contains the oxide represented by the general formula (1) as a main component similarly to the solid particle 2 of FIG. 1. In the figure, for convenience, the solid body 3 is shown as a rectangular solid. However, even when the solid body 3 has a spherical shape, a plate shape, or a needle shape like the solid particle 2 of FIG. 1, the concept thereof is the same.

The solid body 3 has negative thermal expansion properties in the normal condition, and contracts in volume with heating and expands with cooling. According to IEC60068-1 specification (JIS C60068-1 standard) "Environmental Testing—Electricity and Electronics—General Rules," the normal condition in a test of electric products and industrial products is as follows: a temperature of 20° C. (293 K) and an atmospheric pressure of 101.3 kPa. The solid body 3 exhibits negative thermal expansion behavior as an independent object, as shown in FIG. 2. The linear expansion coefficient at 20° C. at that time varies to some degree depending upon the composition, crystal grain diameter, and density and is about $-20 \times 10^{-6}$/K to $-85 \times 10^{-6}$/K. As the crystal grain diameter is smaller and the density is higher, the linear expansion coefficient of the thermal expansion suppressing member tends to increase in the negative direction. On the other hand, when the solid body 3 is made particles and dispersed in a member such as a resin or a metal, it shows such a function that the thermal expansion of the entire member gets close to zero, or is made negative if required, by the thermal stress generated at an interface with the member.

The oxide represented by the general formula (1) refers to a complex metal oxide of Bi, M, and Ni. In other words, a part of the bismuth sites of bismuth nickelate represented by a general formula $BiNiO_3$ is substituted with M.

In the general formula (1), the chemical formula of the oxide is represented so that the atomic ratio of the respective sites is 1:1:3 as an ideal composition. However, actually, similar physical properties are exhibited even when there is an excess or shortage within 10% in the atomic ratio of the respective sites.

The oxide represented by the general formula (1) tends to undergo crystal phase transition with respect to a change in environment temperature or external pressure. For convenience of description, a crystal phase at a lower temperature or lower pressure compared with a phase transition point is referred to as a first phase and a crystal phase at a higher temperature or higher pressure compared with the phase transition point is referred to as a second phase.

The first phase is an antiferromagnetic insulator having a triclinic perovskite structure including a unit cell of $\sqrt{2}a \times \sqrt{2}a \times 2a$. In the unit cell, Bi ions are disproportionated in terms of charge. That is, one half of the Bi ions are trivalent and the other half thereof are pentavalent. Nickel is present as divalent ions, and the chemical formula of bismuth nickelate, the substitution of which with M is omitted, can be represented by $Bi^{3+}_{0.5}Bi^{5+}_{0.5}Ni^{2+}O_3$.

When pressure energy or thermal energy is added to the first phase, charge transfer occurs between $Bi^{5+}$ and $Ni^{2+}$, and phase transition to a second phase, represented by $Bi^{3+}Ni^{3+}O_3$ occurs. The second phase is a conductor having an orthorhombic perovskite structure commonly called a $GdFeO_3$ type. The phase transition undergoes a mixed region of the first phase and the second phase.

The unit cell volume of the second phase is smaller than the unit cell volume of the first phase by about 2.6%. This is because the lattice length of a Ni—O bond is different between divalence and trivalence. This is considered as a factor by which the oxide represented by the general formula (1) exhibits negative thermal expansion properties.

M in the general formula (1) is at least one metal selected from La, Pr, Nd, Sm, Eu, Gd, Tb, Dy, Ho, Er, Tm, Yb, Lu, Y, and In. Trivalent ions of any of these elements are stable and can substitute Bi sites. The thermal stability of the second phase increases by partially substituting the Bi sites with trivalent M. As a result, the lower limit temperature at which the oxide represented by the general formula (1) exhibits negative thermal expansion properties can be extended to lower temperatures. Further, as the ion radius of $M^{3+}$ is smaller, the linear expansion coefficient at 20° C. tends to increase in the negative direction.

It should be noted that a parameter x representing a substitution atomic ratio of M is in a range of $0.02 \leq x \leq 0.15$. When x is smaller than 0.02, thermal decomposition of the oxide is liable to occur at a temperature equal to or lower than the temperature at which the phase transition to the second phase occurs. On the other hand, when x is larger than 0.15, the stability of the second phase becomes too large, and the volume shrinkage involved in the phase transition, that is, the negative linear expansion coefficient becomes small.

When the orthorhombic strain (b/a) of $M^{3+}Ni^{3+}O_3$ is smaller than that of $Bi^{3+}Ni^{3+}O_3$, the stability of the second phase further increases to exert an effect on the suppression of the thermal decomposition in a high temperature range (for example, about 250° C.). From this point of view, M more preferably represents at least one metal selected from La, Pr, Nd, Sm, Eu, and Gd.

A method of producing the oxide represented by the general formula (1) is not particularly limited. A method capable of synthesizing a complex metal oxide in which the metal elements form a uniform solid solution and molding the oxide in any shape is preferred. For example, when the respective oxides of Bi, M, and Ni are mixed at the same molar ratio as that of an intended substance and sintered under a high pressure (e.g., 4 GPa or more), a complex metal oxide in which the respective metal elements form a uniform solid solution is obtained. When the obtained oxide is crushed and molded and baked at a temperature equal to or lower than that for the sintering, the solid particle 2 of FIG. 1 or the solid body 3 of FIG. 2 is obtained.

The solid particle 2 may contain components other than the oxide represented by the general formula (1) (other components). The other components may be dispersed inside the solid particle 2 or cover the surfaces thereof. Examples of the other components include surface modifying components providing dispersibility into the matrix 1, coloring components such as a dye and a pigment, a refractive index adjusting component, and other property adjusting components.

In the case of the anti-thermally-expansive resin of the present invention, the matrix 1 is formed of a resin having a positive linear expansion coefficient at 20° C. The resin may be a thermoplastic resin or a thermosetting resin. Generally, available resin materials have a positive linear expansion coefficient at 20° C., and the linear expansion coefficient is generally larger than that of a metal. A crystalline resin having orientation dependence of the linear expansion coefficient and a fiber reinforced resin showing a linear expansion coefficient close to that of a metal in an orientation direction can also be used in the present invention.

Examples of the resin that may be used in the present invention include resins including a polybenzimidazole (PBI) resin, an epoxy resin, a phenol resin, a melamine resin, a urea resin, a urethane resin, ester resins such as polybutyleneterephthalate and polyethyleneterephthalate, unsaturated polyester resins, polyamides, polyimide, polyamide-imide, polyether imide, polyvinyl chloride, an ABS resin, a fluorocarbon resin, a liquid crystal polymer, polyphenylene sulfide, polysulfone, polyethersulfone, aromatic polyether ketones such as polyether ether ketone, and polycarbonate. Those resins may be mixed with each other to be used for the matrix 1.

Of these resins, the resin that is more preferred as a matrix of the anti-thermally-expansive resin of the present invention is a PBI resin. The PBI resin has a very small coefficient of line expansion, among simple resins containing no filler or the like. The linear expansion coefficient at a glass transition temperature or lower of the general PBI resin is about $23 \times 10^{-6}$/K. In contrast, the linear expansion coefficient in the practical temperature range of the solid particle 2 containing the oxide represented by the general formula (1) is about $-20 \times 10^{-6}$/K to $-30 \times 10^{-6}$/K. When the solid particle 2 is dispersed in the matrix 1 formed of the PBI resin, the stress with respect to external heat is cancelled at the contact interface between the matrix 1 and the solid particle, and hence, not only the overall volume change of the anti-thermally-expansive resin but also local thermal strain can be eliminated.

The resin constructing the matrix 1 may contain other components in a range not impairing the object of the present invention. Examples of the other components include a filler component other than the solid particle 2, a plasticizing component, an antioxidant component, a coloring component, a flame-retardant component, an antistatic component, a foaming component, a defoaming component, a fungicide component, and other property adjusting components.

There is no limit to a method of producing the anti-thermally-expansive resin of the present invention, and a method known as a method of dispersing particles in resin can be used. For example, there may be given a method involving dispersing solid particles in a resin precursor before molding and molding the precursor after the dispersion to obtain an anti-thermally-expansive resin. If the resin is a thermoplastic resin, solid particles are dispersed in a fluid matrix obtained by heating the resin to its glass transition point (softening point) or more, and then, the resin is molded. In the case where the resin is a thermosetting resin or molding is performed integrally with a polymerization reaction, solid particles are dispersed in a material before the reaction, followed by reaction and molding, and thus, the anti-thermally-expansive resin of the present invention is obtained.

In the anti-thermally-expansive resin of the present invention, the volume ratio between the resin constructing the matrix 1 and the solid particle 2 is preferably 10 parts by volume or more and 1,000 parts by volume or less of the solid particles, more preferably 20 parts by volume or more and 500 parts by volume or less of the solid particles, with respect to 100 parts by volume of the resin.

On the other hand, in the case of the anti-thermally-expansive metal of the present invention, the matrix 1 is formed of a metal having a positive linear expansion coefficient at 20° C. The metal may be a pure metal or an alloy, and may contain components other than a metal element so as to adjust properties and prevent oxidation. Some Invar alloys have thermal expansion properties very close to zero. However, most of metal materials generally commercially available have positive thermal expansion properties at 20° C.

In order for the solid particle 2 to fully exhibit the effect of suppressing the thermal expansion of the anti-thermally-expansive metal, the coefficient of linear thermal expansion α at 20° C. of the metal is preferably $10 \times 10^{-6}$/K or more and $30 \times 10^{-6}$/K or less.

Examples of the general-purpose metal whose linear expansion coefficient α at 20° C. is in the above-mentioned range include iron ($11.8 \times 10^{-6}$/K), palladium ($11.8 \times 10^{-6}$/K), cobalt ($13.0 \times 10^{-6}$/K), nickel ($13.4 \times 10^{-6}$/K), gold ($14.2 \times 10^{-6}$/K), stainless steel ($14.7 \times 10^{-6}$/K), copper ($16.5 \times 10^{-6}$/K), phosphor bronze ($17.0 \times 10^{-6}$/K), brass ($17.5 \times 10^{-6}$/K) and general copper alloys; silver ($18.9 \times 10^{-6}$/K); and duralumin ($21.6 \times 10^{-6}$/K) and general aluminum alloys; aluminum ($23.1 \times 10^{-6}$/K); and a magnesium alloy ($27.4 \times 10^{-6}$/K). The numerical values in parentheses indicate typical values of coefficients of linear expansion at 20° C. of respective metals, and there is a slight error depending upon the addition of a trance amount of components and the method of measuring a linear expansion coefficient. For example, stainless steel may vary in linear expansion coefficient depending upon its composition ratio. The linear expansion coefficient α at 20° C. of general-purpose stainless steel is in the range of about $10 \times 10^{-6}$/K or more and $30 \times 10^{-6}$/K or less. Regarding the values of coefficients of linear expansion, mainly Chronological Scientific Tables 2007 (Maruzen) was referred to.

When the linear expansion coefficient α at 20° C. of the metal constructing the matrix 1 is smaller than $10 \times 10^{-6}$/K, the negative thermal expansion effect of the solid particle 2 becomes too large, which may cause an excessive stress on the interface between the metal and the solid particle.

On the other hand, when the linear expansion coefficient α at 20° C. of the metal is larger than $30 \times 10^{-6}$/K, the thermal expansion of the anti-thermally-expansive metal may not be sufficiently suppressed.

In order to use the anti-thermally-expansive member of the present invention as a heat sink (radiator plate, radiator case), it is preferred that the thermal conductivity κ at 0° C. of the metal having a positive linear expansion coefficient be 100 W/mK or more and 410 W/mK or less. Examples of the general-purpose metal whose linear expansion coefficient α at 0° C. is in the above-mentioned range include cobalt (100 W/mK), zinc (117 W/mK), iridium (147 W/mK), tungsten (177 W/mK), aluminum (236 W/mK), duralumin (134 W/mK) and general aluminum alloys; and gold (319 W/mK), copper (403 W/mK), phosphor bronze (133 W/mK), and brass (106 W/mK) and general copper alloys.

When the thermal conductivity κ at 0° C. of the metal is smaller than 100 W/mK, there is a possibility that the heat radiation property of the anti-thermally-expansive metal as a heat sink may not be sufficient.

On the other hand, a metal having a heat conductivity κ at 0° C. of more than 410 W/mK has a particularly large heat radiation property, and hence, the increase in temperature of the anti-thermally-expansive metal becomes small. Therefore, even when the solid particle 2 is dispersed, an effect of suppressing thermal expansion is small.

Considering the degree of cancellation of thermal expansion when joined to solid particles and the heat radiation property as a heat sink, it is preferred that the metal having a positive linear expansion coefficient contain aluminum. The linear expansion coefficient at 20° C. of general aluminum metal is $23.1 \times 10^{-6}$/K. An aluminum alloy also has a linear expansion coefficient close to the above-mentioned value. In contrast, the linear expansion coefficient at 20° C. of the solid particle 2 containing the oxide represented by the general formula (1) is about $-20 \times 10^{-6}$/K to $-85 \times 10^{-6}$/K. When the solid particle 2 is dispersed in the matrix 1 formed of an aluminum-containing metal, the stress with respect to external heat is cancelled at the contact interface between the matrix 1 and the solid particle. Therefore, not only the volume change of the entire anti-thermally-expansive metal but also the local thermal strain can be eliminated. In addition, aluminum and an aluminum alloy are readily available and excellent in processability and joining property.

A method of producing the anti-thermally-expansive metal of the present invention is not limited, and a method known as a method of dispersing particles in metal can be used. Examples of the method include production methods based on a powder metallurgy method, a casting method, and a diffusion coating method.

In the case of the powder metallurgy method, powdery metal, solid particles, and other additive components are mixed, and thereafter, the mixture is molded at room temperature and sintered or hot-pressed. At this time, the dispersibility of the solid particles can also be enhanced by previously covering the surface of the solid particles containing ceramics as a main component with a metal component.

The casting method is also called a molten metal stirring method. According to this method, solid particles are dispersed in molten metal, and the molten metal is poured into a cast to allow the molten metal to solidify. Examples of the production method applying this procedure include a compocasting method, a molten metal injection molding method, a centrifugal casting method, a remelting casting method, and a sedimentation method.

In the case of the diffusion coating method, a porous preform made of the same components as those of the solid particles is formed, and molten metal is allowed to penetrate the preform. At this time, the molten metal may be pressed for the purpose of assisting the penetration (pressure penetration method). Alternatively, penetration may be allowed to proceed under no pressure, using a penetration promoter (non-pressure penetration method).

In the anti-thermally-expansive metal of the present invention, the volume ratio between the metal constructing the matrix 1 and the solid particle 2 is preferably 10 parts by volume or more and 1,000 parts by volume or less of the solid particles, more preferably 20 parts by volume or more and 500 parts by volume or less of the solid particles, with respect to 100 parts by volume of the metal.

The anti-thermally-expansive resin of the present invention can be used as a structural material, recording material, or electronic material with thermal expansion suppressed. The anti-thermally-expansive resin of the present invention can also be used in members and adhesive layers which influence the optical precision of optical equipment such as an image pickup device, a condenser, an exposure device, and an optical observation device. Further, the anti-thermally-expansive resin of the present invention can also be used in members for preventing transfer of a fluid, such as a separator and a seal member. In addition, the anti-thermally-expansive resin of the present invention can also be used as a material for an electrolytic capacitor.

Further, the anti-thermally-expansive metal of the present invention can be used in devices and products used under temperature-changing environments, such as a metal substrate, a heat radiation substrate, a structural material for a precision actuator, a base for an organic photosensitive body, an optical spacer member, an electrode, and a spring. Further, the anti-thermally-expansive metal of the present invention can also be used in structural members required to have high position precision, such as a stage and a table of a liquid crystal producing device.

EXAMPLES

Hereinafter, the present invention is described more specifically by way of examples. However, the present invention is not limited to the following examples.

Solid particles used for producing the anti-thermally-expansive resin and anti-thermally-expansive metal of the present invention were synthesized.

Production Example 1

Bismuth oxide ($Bi_2O_3$), lanthanum oxide ($La_2O_3$), and metal nickel (Ni) were dissolved in a molar ratio of 98/2/100 in minimum nitric acid and stirred thoroughly. A solid body obtained by evaporating and drying the solution thus obtained was calcinated in an electric furnace under an air atmosphere at 750° C. for 12 hours to obtain oxide powder. The oxide powder with 20% by weight of potassium perchlorate ($KClO_4$) mixed therewith was sealed in a capsule made of gold. The capsule was compressed to 6 GPa with a cubic anvil-type high-pressure generator. The capsule under compression was heated at 1,000° C. and kept at this temperature for 30 minutes. After that, the capsule was quenched followed by removal of the pressure, and a sample was taken out. The sample thus taken out was crushed and washed with water to remove a potassium chloride (KCl) component. The remaining crushed sample was dried to obtain solid particles. The sizes of the solid particles observed with an optical microscope was found to be within the range of about 1 to 500 μm, and the average particle size was 100 μm.

According to X-ray diffraction measurement, the solid particles had a triclinic perovskite structure at room temperature (20° C.) and underwent phase transition to an orthorhombic perovskite structure at around 180° C. In addition, the atomic ratio of bismuth, lanthanum, and nickel was found to be substantially the same as a charged ratio according to the X-ray fluorescence analysis. Therefore, it was found that the composition formula of the solid particles was able to be represented by $Bi_{0.98}La_{0.02}NiO_3$.

Next, for the purpose of evaluating the thermal expansion properties of the solid particles alone, the solid particles were sealed again in a capsule made of gold. The capsule was compressed to 6 GPa and heated at 800° C. for 30 minutes. The capsule was quenched followed by removal of the pressure, and a sample was taken out. The sample thus taken out was a pellet-shaped solid body. The surface of the pellet was polished to obtain a disk-shaped sample with a diameter of 2.5 mm and a thickness of 0.5 mm.

A strain gauge (produced by Kyowa Electronic Instruments Co., Ltd.) was attached to the disk-shaped sample, using an adhesive (PC-6, produced by Kyowa Electronic Instruments Co., Ltd.), and a linear expansion coefficient was measured from the strain at temperatures from 0° C. to 130° C.

Consequently, the member exhibited a linear reduction in volume with respect to the increase in temperature in the entire temperature region, and the value of the typical linear expansion coefficient α determined by the tangent at 20° C. was $-21 \times 10^{-6}$/K.

Production Examples 2 to 46

Bismuth oxide ($Bi_2O_3$), metal nickel (Ni), and an oxide of metal M ($M_2O_3$) were dissolved in minimum nitric acid so as to obtain the same molar ratio as that of the intended composition shown in Table 1, followed by the same procedure in Production Example 1, and thus, a solid particle and a disk-shaped sample were obtained.

According to X-ray diffraction measurement of the solid particle, it was confirmed that the solid particles of Production Examples 2 to 46 had the same crystal structure as that of Production Example 1. Further, any of the samples of Production Examples 2 to 46 exhibited phase transition behavior to an orthorhombic system, but the transition temperatures were different from each other. The transition temperature tended to shift to lower temperatures as the substitution amount of the metal M increased, and the shift width tended to increase as the ion radius of the metal M was larger.

The value of the linear expansion coefficient α in the range of 0° C. to 100° C. calculated by subjecting the results of the X-ray diffraction measurement of the solid particles of Production Example 2 to the Rietveld refinement was $-137 \times 10^{-6}$/K. The linear expansion coefficient was a theoretical value peculiar to the material for which the influence of voids (pores) and microstructural defects possibly contained in the solid particles is removed.

It was confirmed by X-ray fluorescence analysis that the solid particles of Production Examples 2 to 46 had the intended compositions shown in Table 1. Next, the linear expansion coefficient of a disk-shaped sample was measured in the same way as in Production Example 1. As a result, all the samples exhibited linear and negative thermal expansion properties in the entire region from 0° C. to 130° C. As the trivalent ion radius of the metal M was smaller, the magnitude of strain at temperature increase tended to be matched with that at temperature decrease.

The typical coefficients of linear expansion α at 20° C. of the thermal expansion suppressing members of Production Examples 2 to 46 were $-19 \times 10^{-6}$/K to $-28 \times 10^{-6}$/K. The specific value of the linear expansion coefficient α at 20° C. of each sample is as shown in Table 1.

Production Example 47 for Comparison

Metal oxide powder and a metal oxide disk for comparison were synthesized in the same way as in Production Example 1, except that the substitution of La with respect to Bi sites was not conducted.

According to X-ray diffraction measurement, the metal oxide had a triclinic perovskite crystal at room temperature (20° C.), and underwent phase transition to an orthorhombic perovskite structure at around 230° C. The oxide was thermally decomposed at the same time as the phase transition, and hence, the oxide did not return to the triclinic perovskite structure at temperature decrease.

Next, the linear expansion coefficient of the disk-shaped sample was measured in the same way as in Production Example 1, and as a result, the disk-shaped sample exhibited positive thermal expansion properties in the region of 0° C. to 30° C. In the region of 30° C. or higher, negative thermal expansion properties were observed partially, but the properties were not reversible in repeated measurements. The typical linear expansion coefficient α at 20° C. was $+3 \times 10^{-6}$/K.

Production Example 48 for Comparison

Metal oxide powder and a metal oxide disk for comparison were synthesized in the same way as in Production Example 1, except for setting the substitution ratio of La with respect to the Bi sites to be 20%.

According to X-ray diffraction measurement, the metal oxide was an orthorhombic or rhombohedral perovskite crystal at room temperature (20° C.) However, the phenomenon of crystal phase transition was not confirmed by temperature scanning up to 300° C.

Next, the linear expansion coefficient of a disk-shaped sample was measured in the same way as in Production Example 1, and as a result, the disk-shaped sample exhibited positive thermal expansion properties in the entire region of 0° C. to 130° C. The typical linear expansion coefficient α at 20° C. was $+2 \times 10^{-6}$/K.

TABLE 1

| | M | x | α ($\times 10^{-6}$/K) |
|---|---|---|---|
| Production Example 1 | La | 0.02 | −21 |
| Production Example 2 | La | 0.05 | −23 |
| Production Example 3 | La | 0.10 | −24 |
| Production Example 4 | La | 0.15 | −24 |
| Production Example 5 | Pr | 0.02 | −22 |
| Production Example 6 | Pr | 0.05 | −24 |
| Production Example 7 | Pr | 0.15 | −24 |
| Production Example 8 | Nd | 0.02 | −22 |
| Production Example 9 | Nd | 0.05 | −25 |
| Production Example 10 | Nd | 0.15 | −25 |
| Production Example 11 | Sm | 0.02 | −22 |
| Production Example 12 | Sm | 0.05 | −25 |
| Production Example 13 | Sm | 0.15 | −25 |
| Production Example 14 | Eu | 0.02 | −24 |
| Production Example 15 | Eu | 0.05 | −26 |
| Production Example 16 | Eu | 0.15 | −26 |
| Production Example 17 | Gd | 0.02 | −24 |
| Production Example 18 | Gd | 0.05 | −26 |
| Production Example 19 | Gd | 0.15 | −26 |
| Production Example 20 | Tb | 0.02 | −24 |
| Production Example 21 | Tb | 0.05 | −26 |

TABLE 1-continued

| | M | x | α (×10⁻⁶/K) |
|---|---|---|---|
| Production Example 22 | Tb | 0.15 | −27 |
| Production Example 23 | Dy | 0.02 | −24 |
| Production Example 24 | Dy | 0.05 | −27 |
| Production Example 25 | Dy | 0.15 | −27 |
| Production Example 26 | Ho | 0.02 | −25 |
| Production Example 27 | Ho | 0.05 | −26 |
| Production Example 28 | Ho | 0.15 | −27 |
| Production Example 29 | Er | 0.02 | −26 |
| Production Example 30 | Er | 0.05 | −27 |
| Production Example 31 | Er | 0.15 | −28 |
| Production Example 32 | Tm | 0.02 | −24 |
| Production Example 33 | Tm | 0.05 | −26 |
| Production Example 34 | Tm | 0.15 | −28 |
| Production Example 35 | Yb | 0.02 | −24 |
| Production Example 36 | Yb | 0.05 | −25 |
| Production Example 37 | Yb | 0.15 | −27 |
| Production Example 38 | Lu | 0.02 | −25 |
| Production Example 39 | Lu | 0.05 | −27 |
| Production Example 40 | Lu | 0.15 | −27 |
| Production Example 41 | Y | 0.02 | −19 |
| Production Example 42 | Y | 0.05 | −22 |
| Production Example 43 | Y | 0.15 | −23 |
| Production Example 44 | In | 0.02 | −19 |
| Production Example 45 | In | 0.05 | −21 |
| Production Example 46 | In | 0.15 | −22 |
| Production Example 47 | None | 0.00 | +3 |
| Production Example 48 | La | 0.20 | +2 |

Production Example 49

Solid particles used for producing the anti-thermally-expansive resin and anti-thermally-expansive metal of the present invention and a disk-shaped sample were produced in the same way as in Production Example 2, except for controlling sintering so that the moisture amount in the sintering process became small. If a capsule for synthesis under a high pressure contains water, a hydrothermal reaction is liable to occur in the sintering process, and thus, crystal grains tend to become large.

Bismuth oxide ($Bi_2O_3$), lanthanum oxide ($La_2O_3$), and metal nickel (Ni) were dissolved in a molar ratio of 95/5/100 in minimum nitric acid and stirred thoroughly. A solid body obtained by evaporating and drying the solution thus obtained was calcinated in an electric furnace under an air atmosphere at 750° C. for 12 hours to obtain oxide powder. The oxide powder with 20% by weight of potassium perchlorate ($KClO_4$) previously dried at 150° C. mixed therewith was sealed in a capsule made of gold. The capsule was compressed to 6 GPa with a cubic anvil-type high-pressure generator. The capsule under compression was heated at 1,000° C. and kept at this temperature for 30 minutes. After that, the capsule was quenched followed by removal of the pressure, and a sample was taken out. The sample thus taken out was crushed and washed with water to remove a potassium chloride (KCl) component. The remaining crushed sample was dried by heating at 150° C. to obtain solid particles. A disk-shaped sample was also obtained in the same way as in Production Example 1.

It was confirmed by X-ray diffraction measurement of the solid particles that the solid particles of Production Example 49 had the same crystal structure as those of Production Examples 1 to 46. The value of the linear expansion coefficient α in a range of 0° C. to 100° C. calculated by subjecting the results of the X-ray diffraction measurement to the Rietveld refinement was $-137 \times 10^{-6}$/K in the same way as in Production Example 2.

The atomic ratio of bismuth, lanthanum, and nickel was found to be substantially the same as the charged ratio according to the X-ray fluorescence analysis. Therefore, it was found that the composition formula of the thermal expansion suppressing member of the present invention was able to be represented by $Bi_{0.95}La_{0.05}NiO_3$.

Next, the linear expansion coefficient of the disk-shaped sample was measured in the same way as in Production Example 1. As a result, the disk-shaped sample exhibited linear and negative thermal expansion properties in the entire region of 0° C. to 130° C., and the linear expansion coefficient α at 20° C. was $-82 \times 10^{-6}$/K. This linear expansion coefficient was larger than $-23 \times 10^{-6}$/K of Production Example 2, and it is understood that the linear expansion coefficient can be controlled by production conditions even with the same composition.

Example 1

A polybenzimidazole (PBI) resin pellet for compression molding and the solid particles prepared in Production Example 2 were mixed in an equal volume and heated under pressure to obtain an anti-thermally-expansive resin of the present invention.

According to optical microscope observation of a cross-section of the obtained resin, the solid particles were dispersed homogeneously in the PBI resin without any aggregation, and the solid particles and the PBI resin were in contact with each other without any gap at the interface therebetween.

A strain gauge was attached to both surfaces of the anti-thermally-expansive resin which had been formed into a plate shape, and the linear expansion coefficient was measured from strains at 20° C. to 100° C. As a result, the resin showed almost no volume change in the entire region, and the typical linear expansion coefficient, as determined by the tangent at 20° C., was within $\pm 0.5 \times 10^{-6}$/K. Considering the measurement precision of strain, it can be said that this anti-thermally-expansive member has almost zero thermal expansion. The reason for this is considered as follows: the linear expansion coefficient ($23 \times 10^{-6}$/K at 20° C.) of PBI and the linear expansion coefficient ($-23 \times 10^{-6}$/K at 20° C.) of the thermal expansion suppressing member of Production Example 2 cancelled each other.

Separately, the effect of reducing a volume change caused by external heat was also obtained in each of PBI-based resins in which the solid particles of Production Example 1 and Production Examples 3 to 46 were dispersed in the same way, respectively.

Example 2

The solid particles prepared in Production Example 3 were mixed with an epoxy-based UV-curable adhesive of a cation polymerization type at a volume ratio of 6:4. The linear expansion coefficient (glass transition temperature or lower) of the epoxy-based adhesive alone is $40 \times 10^{-6}$K. The mixture was applied to the surface of a releasing film and irradiated with UV light with an irradiation intensity of 400 mW for 15 seconds to cure the epoxy resin. The cured resin was peeled off from the film and formed into a sheet shape to obtain the anti-thermally-expansive resin of the present invention. According to microscope observation, the solid particles were dispersed homogeneously, and the contact state between the solid particles and the epoxy resin was satisfactory.

The linear expansion coefficient of the sheet-shaped sample was measured in the same way as in Example 1. As a result, the linear expansion coefficient at 20° C. to 100° C. of the resin was $10 \times 10^{-6}$/K or less.

Separately, the effect of reducing a volume change caused by external heat was also obtained in each of epoxy-based resins in which the solid particles of Production Examples 1 and 2 and Production Examples 4 to 46 were dispersed in the same way, respectively.

Example 3

Five grams of the solid particles prepared in Production Example 4 and 10 g of iron p-toluenesulfonate as an oxidant were mixed with 100 g of an ethanol solution of 20% by weight of unsubstituted pyrrole as a polymerizable monomer. The mixed solution was applied onto a niobium porous substrate covered with a niobium oxide dielectric and allowed to stand at room temperature for 24 hours. Thus, a polymerization reaction was allowed to proceed. As a result, an anti-thermally-expansive resin of the present invention by a polypyrrole resin film (thickness: 100 μm) was obtained.

An electrode was provided in an upper portion of the polypyrrole resin film, and a change in capacitance was investigated by a thermal cycle test at −30° C. to 85° C. According to the investigation, the capacitance of the polypyrrole resin film corresponding to the anti-thermally-expansive resin of the present invention was maintained at 99% or more even after the change in temperature of 1,000 cycles. The reason for this is considered as follows: the volume change with respect to external heat of the anti-thermally-expansive resin of the present invention is small, and hence, the polypyrrole resin film was prevented from peeling off from the substrate.

Separately, the same effect was also obtained in each of polypyrrole-based resins in which the solid particles of Production Examples 1 to 3 and Production Examples 5 to 46 were dispersed in the same way, respectively.

Example 4

A mold was filled with the solid particles prepared in Production Example 2 so that the volume fraction after the dispersion in metal became 50%. After that, molten aluminum metal (with a silicon component mixed) was poured in the mold. The metal was solidified by cooling, and then, the metal slug was taken out of the mold. Then, the metal slug was heat-treated at 500° C. for a retention time of 3 hours, and thus, an anti-thermally-expansive metal of the present invention was obtained.

According to density measurement, the metal had a relative density of 97% or more, and thus, the composite condition was satisfactory. According to microscope observation, the solid particles were dispersed in aluminum metal homogeneously without any aggregation, and no gaps and reactive layers were present at the contact interface between the solid particles and the PBI resin.

The metal was processed to 12 mm×12 mm×1.5 mm thickness, and a strain gauge was attached to both surfaces. Thus, a linear expansion coefficient was measured from strains at 20° C. to 100° C. As a result, the metal hardly underwent a volume change over the entire region, and the typical linear expansion coefficient determined by the tangent at 20° C. was within $\pm 0.5 \times 10^{-6}$/K. Considering the measurement precision of strain, it can be said that this anti-thermally-expansive member has almost zero thermal expansion. The reason for this is considered as follows: the linear expansion coefficient ($23 \times 10^{-6}$/K at 20° C.) of aluminum and the linear expansion coefficient ($-23 \times 10^{-6}$/K at 20° C.) of the thermal expansion suppressing member of Production Example 2 cancelled each other.

Separately, the same effect was also obtained in each of aluminum metals in which the solid particles of Production Example 1, Production Examples 3 to 46, and Production Example 49 were dispersed in the same way, respectively.

According to the present invention, the anti-thermally-expansive resin and anti-thermally-expansive metal each having reduced thermal expansion can be provided by dispersing the thermal expansion suppressing member having negative thermal expansion properties in a resin or a metal.

The anti-thermally-expansive resin of the present invention can be used as a structural material, recording material, or electronic material with thermal expansion suppressed. The anti-thermally-expansive resin of the present invention can also be used in members and adhesive layers which affect the optical precision of optical equipment such as an image pickup device, a condenser, an exposure device, and an optical observation device. Further, the anti-thermally-expansive resin of the present invention can also be used in members for preventing transfer of a fluid, such as a separator and a seal member. In addition, the anti-thermally-expansive resin of the present invention can also be used as a material for an electrolytic capacitor.

Further, the anti-thermally-expansive metal of the present invention can be used in devices and products used under temperature-changing environments, such as a metal substrate, a heat radiation substrate, a structural material for a precision actuator, a base for an organic photosensitive body, an optical spacer member, an electrode, and a spring. Further, the anti-thermally-expansive metal of the present invention can also be used in structural members required to have high position precision, such as a stage and a table of a liquid crystal producing device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A metal composite, comprising:
   a metal having a positive linear expansion coefficient at 20° C.; and
   a solid particle, which has negative thermal expansion properties at a normal condition and which is dispersed in the metal,
   wherein the solid particle comprises at least an oxide represented by general formula (1):

$$(Bi_{1-x}M_x)NiO_3 \qquad (1),$$

where M represents at least one metal selected from the group consisting of La, Pr, Nd, Sm, Eu, Gd, Tb, Dy, Ho, Er, Tm, Yb, Lu, Y, and In; and x represents a numerical value of $0.02 \leq x \leq 0.15$.

2. The metal composite according to claim 1, wherein a linear expansion coefficient α at 20° C. of the metal having a positive linear expansion coefficient is $10 \times 10^{-6}$/K or more and $30 \times 10^{-6}$/K or less.

3. The metal composite according to claim 2, wherein the metal having a positive linear expansion coefficient comprises at least one selected from the group consisting of iron, palladium, cobalt, nickel, gold, stainless steel, copper, phosphor bronze, brass, a copper alloy, silver, duralumin, an aluminum alloy, a magnesium alloy, and aluminum.